(12) United States Patent
Takai et al.

(10) Patent No.: US 7,423,841 B2
(45) Date of Patent: Sep. 9, 2008

(54) DISCRETE TRACK MAGNETIC RECORDING MEDIUM WITH LIFT-ADJUSTING SURFACE

(75) Inventors: Mitsuru Takai, Tokyo (JP); Kazuhiro Hattori, Tokyo (JP)

(73) Assignee: TDK Corporation, Tokyo (JP)

( * ) Notice: Subject to any disclaimer, the term of this patent is extended or adjusted under 35 U.S.C. 154(b) by 374 days.

(21) Appl. No.: 10/891,055

(22) Filed: Jul. 15, 2004

(65) Prior Publication Data

US 2005/0013047 A1    Jan. 20, 2005

(30) Foreign Application Priority Data

Jul. 17, 2003    (JP)    ............................. 2003-198200

(51) Int. Cl.
*G11B 5/82* (2006.01)
*G11B 21/21* (2006.01)

(52) U.S. Cl. ...................................... 360/135
(58) Field of Classification Search .................. 360/135, 360/131
See application file for complete search history.

(56) References Cited

U.S. PATENT DOCUMENTS

| | | | |
|---|---|---|---|
| 5,959,814 A * | 9/1999 | Mallary et al. | 360/135 |
| 6,057,984 A * | 5/2000 | Arita et al. | 360/135 |
| 6,075,683 A * | 6/2000 | Harwood et al. | 360/135 |
| 6,563,673 B2 * | 5/2003 | Mundt et al. | 360/135 |
| 7,016,154 B2 * | 3/2006 | Nishihira | 360/135 |
| 2005/0134992 A1 * | 6/2005 | Homola et al. | 360/75 |
| 2006/0172153 A1 * | 8/2006 | Kikitsu et al. | 428/826 |

FOREIGN PATENT DOCUMENTS

| | | |
|---|---|---|
| JP | 4-310621 | 11/1992 |
| JP | 5-210929 | 8/1993 |
| JP | 10-177718 | 6/1998 |
| JP | 2001-034929 A * | 2/2001 |

OTHER PUBLICATIONS

IBM TDB, "Disk Pattern to Boost the Fly Height of an Air Bearing Slider", Aug. 1994, v. 37, No. 8, pp. 189-190.*
English Language Abstract of JP 4-310621.
English language Abstract of JP 10-17718.
English language Abstract of JP 5-210929.

* cited by examiner

*Primary Examiner*—Julie Anne Watko
(74) *Attorney, Agent, or Firm*—Greenblum & Bernstein, P.L.C.

(57) ABSTRACT

A magnetic recording medium capable of preventing contact with a magnetic head for use in recording or reproduction, during recording or reproducing of record data. The magnetic recording medium has a disk-shaped substrate having a surface formed with an annular data-recording area, an outer area outward of the data-recording area, and an inner area inward of the same. The annular data-recording area has a plurality of tracks separated from each other by concentric separating grooves. At least one of the outer area and the inner is subjected to lift-adjusting treatment for enabling adjustment of lifts applied to the magnetic head. This makes it possible to effectively prevent the magnetic head from being inclined to be brought into contact with the magnetic recording medium.

1 Claim, 5 Drawing Sheets

| MEASURING POSITION (DISTANCE FROM CENTER OF DISK (mm)) | FLYING HEIGHT (nm) | |
|---|---|---|
| | EXAMPLE | COMPARATIVE EXAMPLE |
| 4.0 | 9.0 | 14.0 |
| 4.2 | 9.1 | 12.2 |
| 4.4 | 9.2 | 10.2 |
| 4.6 | 9.3 | 9.7 |
| 4.8 | 9.2 | 9.4 |
| 5.0 | 9.1 | 9.3 |
| 6.0 | 9.0 | 9.2 |
| 7.0 | 8.9 | 9.1 |
| 8.0 | 8.8 | 9.0 |
| 9.0 | 8.7 | 8.9 |
| 9.8 | 8.6 | 8.8 |
| 10.0 | 8.6 | 8.8 |
| 10.2 | 8.6 | 9.2 |
| 10.4 | 8.5 | 9.7 |
| 10.6 | 8.5 | 11.2 |
| 10.8 | 8.4 | 12.2 |

DISCRETE TRACK MAGNETIC RECORDING MEDIUM WITH LIFT-ADJUSTING SURFACE

BACKGROUND OF THE INVENTION

1. Field of the Invention

The present invention relates to a discrete track magnetic recording medium having one surface or both surfaces of a disk-shaped substrate thereof formed with an annular data-recording area having a plurality of tracks separated from each other by concentric separating grooves or a spiral separating groove.

2. Description of the Related Art

Today, as a recording medium on which high density recording can be performed, there has been developed a discrete track magnetic recording medium (e.g. a magnetic recording medium disclosed in Japanese Laid-Open Patent Publication No.H04-310621. This magnetic recording medium has a disk-shaped substrate formed with a data-recording area having a plurality of data-recording tracks (hereinafter simply referred to as "tracks") magnetically separated from each other by a plurality of concentric grooves. This kind of discrete track magnetic recording medium (hereinafter also referred to as the "discrete track medium") is mounted e.g. on an HDD (Hard Disk Drive), and various record data are magnetically recorded thereon via a magnetic head for use in recording or reproduction (hereinafter also referred to as the "magnetic head"). In this case, in the discrete track medium, grooves are provided between tracks to thereby prevent undesired increase in effective recording track width, due to the leakage field from the magnetic head. Further, the discrete track medium has the advantage of reduced occurrences of recording of record data on adjacent tracks and reproduction of record data recorded on adjacent tracks (cross-talk). This makes it possible to reduce the pitch at which tracks are to be formed (hereinafter referred to as the "track pitch"), whereby record data can be recorded with high density.

On the other hand, in an HDD having this kind of discrete track medium (e.g. a discrete track medium 51 shown in FIG. 7) mounted thereon, during recording or reproducing of record data, a motor causes the discrete track medium 51 to be rotated at high speed. Further, as shown in FIG. 8, a servo control mechanism, for example, moves (performs servo control of) a magnetic head 71 along the radius of the discrete track medium 51 such that the central portion of the magnetic head 71 is placed on any one of tracks 62 in a data-recording area 53 formed on a disk-shaped substrate 52. In this case, an air current is generated between the magnetic head 71 and the discrete track medium 51 (data-recording area 53) by the high-speed rotation of the discrete track medium 51, which causes the magnetic head 71 to fly by a lift generated by the air current. As a result, it is possible to move (rotate) the discrete track medium 51 and the magnetic head 71 such that they are prevented from contacting each other.

However, from the study of the proposed discrete track medium 51, the present inventors found out the following points for improvement: In the discrete track medium 51 of the above-mentioned kind, as shown in FIG. 7, an outer area 54 and an inner area 55, neither of which has any grooves 61 (see FIG. 8) formed therein, exist outward and inward of the data-recording area 53 on the disk-shaped substrate 52, and hence inconveniences are caused by the areas 54 and 55. More specifically, as shown in FIG. 9, when data is recorded on or reproduced from a track 62A at the outermost location in the data-recording area 53, it is required to place the central portion of the magnetic head 71 on the track 62A, so that an outer portion of the magnetic head 71, outward of the central portion of the same, protrudes into a region above the outer area 54.

In this case, as shown in FIG. 9, the volume of a space defined between the outer portion of the magnetic head 71 and the outer area 54 is smaller than the volume of a space defined between the inner portion of the magnetic head 71 and the data-recording area 53, by an amount corresponding to grooves 61 that are not formed in the outer area 54. Now, the aforementioned lift applied to the magnetic head 71 tends to become larger, as the amount of air between the magnetic head 71 and the discrete track medium 51 is smaller, that is, the volume of a space defined therebetween is smaller. Therefore, as shown in FIG. 9, in a state where the magnetic head 71 is parallel to the surface of the discrete track medium 51, a lift F5 applied to the outer portion of the magnetic head 71 becomes larger than a lift F6 applied to the inner portion of the magnetic head 71. As a result, as shown in FIG. 10, the magnetic head 71 is inclined until the volume of the space defined between the outer portion of the magnetic head 71 and the outer area 54 becomes equal to the volume of the space defined between the inner portion of the magnetic head 71 and the data-recording area 53 (i.e. until the lift F5 becomes equal to the lift F6). Therefore, as shown in FIG. 10, the discrete track medium 51 suffers from the problem that the magnetic head 71 can contact the surface of the discrete track medium 51 (data-recording area 53) due to the thus caused inclination of the magnetic head 71.

SUMMARY OF THE INVENTION

The present invention has been made to solve the above described problem, and a main object thereof is to provide a magnetic recording medium capable of preventing contact with a magnetic head for use in recording or reproduction, during recording or reproducing of record data.

To attain the above object, the present invention provides a discrete track magnetic recording medium having at least one surface of a disk-shaped substrate thereof formed with an annular data-recording area having a plurality of tracks separated from each other by concentric separating grooves or a spiral separating groove, wherein at least one of an outer area located outward of the data-recording area on the at least one surface, and an inner area located inward of the data-recording area on the at least one surface is subjected to lift-adjusting treatment for enabling adjustment of lifts applied to a magnetic head for use in recording or reproduction. It should be noted that the discrete track magnetic recording medium according to the present invention includes not only a magnetic recording medium including a data-recording area in which data-recording tracks (magnetic material portions) formed adjacent to one another are magnetically separated from one another by a plurality of concentrically-formed grooves or a spirally-formed groove but also a so-called patterned medium having data-recording portions (magnetic material portions) formed by sectioning a data-recording area into the form of a mesh or into the form of dots (by also magnetically separating each data-recording track in a longitudinal direction thereof into a plurality of portions) such that the data-recording portions are in the form of islands isolated from each other.

According to this magnetic recording medium, at least one of the outer area and the inner area is subjected to the lift-adjusting treatment for enabling adjustment of lifts applied to the magnetic head, whereby e.g. even when the magnetic head for use in recording or reproduction is placed on a track at the outermost location or on a track at the innermost location in the data-recording area, causing the outer portion (or inner portion) of the magnetic head to protrude outwardly (inwardly) of the data-recording area, the volume of a space defined between the protruding portion and the outer area (or the inner area), and the volume of a space defined between a non-protruding portion of the magnetic head and the data-recording area can be held equal or approximately equal to each other. Therefore, a lift applied to the protruding portion of the magnetic head and a lift applied to the non-protruding portion thereof can be held equal or approximately equal to each other, so that the magnetic head can be caused to fly such that it is parallel or approximately parallel to (horizontal or approximately horizontal with respect to) the magnetic recording medium. This makes it possible to effectively prevent the magnetic head from being inclined to be brought into contact with the magnetic recording medium during recording or reproducing of record data.

Preferably, an entire area or an approximately entire area of at least one of the outer area and the inner area is subjected to the lift-adjusting treatment. According to this preferred embodiment, irrespective of the protruding length of a portion of the magnetic head protruding outwardly (or inwardly) of the data-recording area, the volume of the space defined between the protruding portion and the outer area (or the inner area) and the volume of the space defined between the non-protruding portion and the data-recording area can be held equal or approximately equal to each other. This makes it possible to mount the magnetic recording medium capable of effectively preventing contact with the magnetic head, on various kinds of recording/reproducing apparatuses equipped with magnetic heads different in size (width).

Preferably, the lift-adjusting treatment is carried out on an annular area in one of the outer area and the inner area, the annular area being adjacent to the data-recording area and having a width at least equal to a length of a protruding portion of the magnetic head, which protrudes over the one of the outer area and the inner area when the magnetic head is placed on a closest one of the tracks to the one of the outer area and the inner area. It should be noted that it is possible to execute the lift-adjusting treatment on both of an annular area in the outer area and an annular area in the inner area. According to this preferred embodiment, the lift-adjusting treatment is carried out on the annular area in one of the outer area and the inner area of the data-recording area, which is adjacent to the data-recording area and has a width at least equal to the protruding length of the protruding portion of the magnetic head protruding over one of the outer area and the inner area. According to this configuration, the area to be subjected to the lift-adjusting treatment can be reduced to the required minimum in accordance with the size of the magnetic head of the recording/reproducing apparatus, and therefore it is possible to reduce a to-be-machined area e.g. of a stamp (mold) for use in the lift-adjusting treatment. This makes it possible to reduce the machining costs of the stamp, thereby making it possible to reduce the manufacturing costs of the magnetic recording medium. Further, if the lift-adjusting treatment is carried out on both of the annular area in the outer area and the annular area in the inner area, even when a recording/reproducing process is carried out on an arbitrary portion of the data-recording area, it is possible to effectively prevent the magnetic head from being inclined to be brought into contact with the magnetic recording medium.

Preferably, lift-adjusting grooves which have a same shape or an approximately same shape as that of the separating grooves and are concentrically or spirally formed are provided by the lift-adjusting treatment. According to this preferred embodiment, e.g. when a resist pattern-forming stamp (mold) for use in forming the separating grooves and the lift-adjusting grooves is produced, it is possible to form recesses (or protrusions) corresponding to the separating grooves and recesses (or protrusions) corresponding to the lift-adjusting grooves under the same conditions. This makes it possible to form the lift-adjusting grooves into accurate shapes, in the same manner as the separating grooves are formed.

It should be noted that the present disclosure relates to the subject matter included in Japanese Patent Application No. 2003-198200 filed on Jul. 17, 2003, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

The present invention will now be described in detail with reference to the accompanying drawings showing a preferred embodiment thereof.

Figure 1:
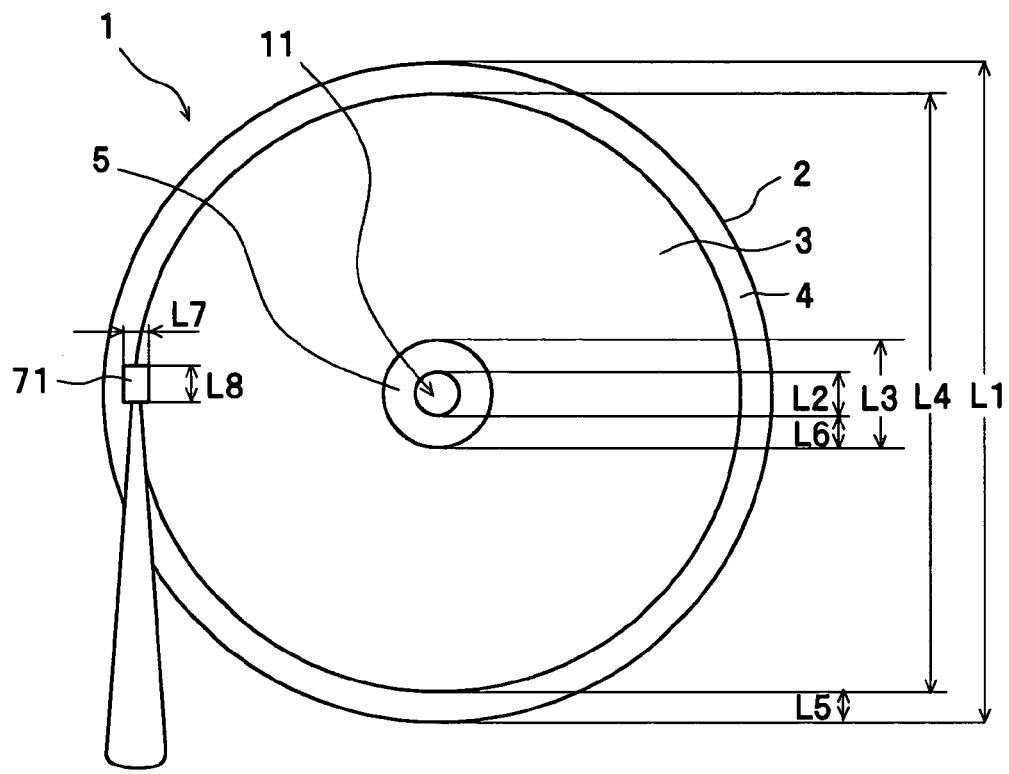
FIG. 1 is a plan view of a discrete track medium according to an embodiment of the present invention, in a state in which a recording/reproducing process is being executed on the discrete track medium.

A discrete track magnetic recording medium 1 (hereinafter also referred to as the "discrete track medium 1") shown in FIG. 1 is an example of a magnetic recording medium according to the present invention, and configured such that a disk-shaped substrate 2 has a data-recording area 3, an outer area 4, and an inner area 5 formed on a surface (at least one surface) thereof. In this case, the discrete track medium 1 is mounted on an HDD, not shown, for magnetically recording various kinds of record data inputted via a magnetic head 71 (see FIG. 1) of the HDD, while being driven for high-speed rotation by a motor of the HDD.

Figure 2:
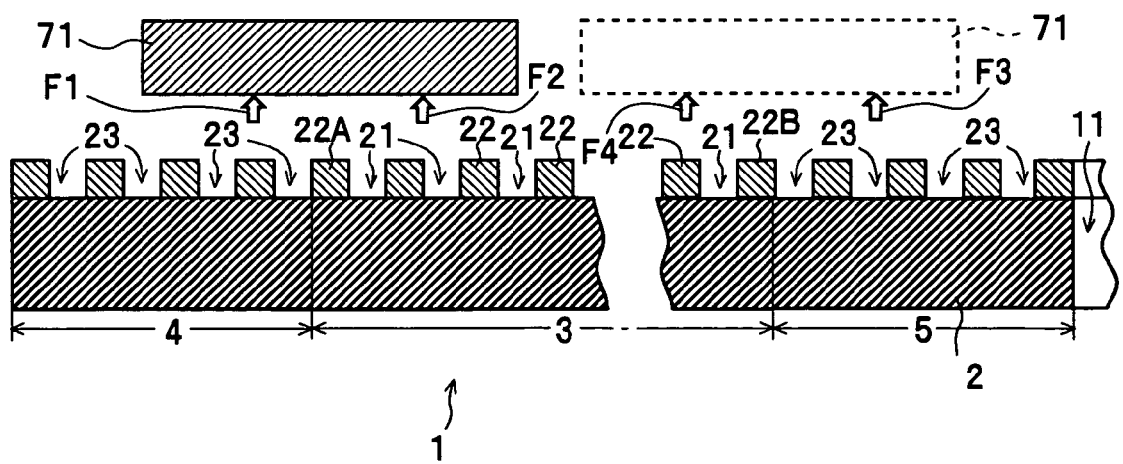
FIG. 2 is a cross-sectional view of the discrete track medium in the state in which the recording/reproducing process is being executed on the discrete track medium.

As shown in FIG. 1, the disk-shaped substrate 2 is in the form of a disk made of e.g. glass. In this case, the disk-shaped substrate 2 is defined to have an outer diameter L1 of e.g. 21.6 mm. Further, the disk-shaped substrate 2 is configured to have a central portion formed with a central hole 11 (hole through which a rotational shaft of a motor is inserted) having a diameter L2 of e.g. 6.0 mm. The data-recording area 3 is an area where various data can be recorded, and as shown in FIG. 2, has a plurality of recording tracks 22, 22, . . . , separated from each other by a plurality of grooves (separating grooves) 21, 21, . . . In this case, the grooves 21, 21, . . . are concentrically formed around the center of the disk-shaped substrate 2 at a constant pitch (at equal intervals). Further, as shown in FIG. 1, the data-recording area 3 is defined to have an annular shape with an inner diameter L3 of e.g. 8.0 mm, and an outer diameter L4 of e.g. 20.6 mm. It should be noted that for purposes of ease of understanding of the present invention, in FIG. 1, the areas 3 to 5 are shown in different proportions from actual proportions therebetween. Further, in FIG. 2, the grooves 21, the tracks 22, and grooves 23, described hereinafter, are shown in an exaggerating manner such that they are larger in size than they actually are.

Referring to FIG. 1, the outer area 4 is located outward of the data-recording area 3 on the surface of the disk-shaped substrate 2, and defined to occupy an annular area having a width L5 of 0.5 mm (½ of the difference between the outer diameter L1 (21.6 mm) of the disk-shaped substrate 2 and the outer diameter L4 (20.6 mm) of the data-recording area 3). In this case, as shown in FIG. 2, the entire outer area 4 is formed with a plurality of grooves (lift-adjusting grooves) 23, 23, . . . (subjected to groove-forming treatment (lift-adjusting treatment)). The grooves 23 have the same shape as that of the grooves 21, and are concentrically formed at the same pitch as that of the grooves 21. Further, as described hereinafter, the outer area 4 has a function of adjusting a lift (lifting force) applied to the magnetic head 71 when the magnetic head 71 is placed on a track 22 (e.g. a track 22A shown in FIG. 2) at an outer location (adjacent to the outer area 4), causing a portion of the magnetic head 71 to protrude into a region above the outer area 4, during recording or reproducing record data on or from the discrete track medium 1.

As shown in FIG. 1, the inner area 5 is located inward of the data-recording area 3 on the surface of the disk-shaped substrate 2, and defined to occupy an annular area having a width L6 of 1.0 mm (½ of the difference between the inner diameter L3 (8.0 mm) of the data-recording area 3 and the diameter L2 (6.0 mm) of the central hole 11 of the disk-shaped substrate 2). In this case, as shown in FIG. 2, the entire inner area 5 is formed with a plurality of grooves 23, 23, . . . (subjected to the groove-forming treatment (lift-adjusting treatment)), which have the same shape as that of the grooves 21, and are concentrically formed at the same pitch as the pitch of the grooves 21. Further, as described hereinafter, the inner area 5 has a function of adjusting a lift applied to the magnetic head 71, when the magnetic head 71 is placed on a track 22 (e.g. a track 22B shown in FIG. 2) at an inner location (adjacent to the inner area 5), causing a portion of the magnetic head 71 to protrude into the inner area 5, during recording or reproducing of record data on or from the discrete track medium 1. It should be noted that as shown in FIG. 1, the magnetic head 71 of the HDD having the disk-shaped substrate 2 mounted thereon is defined to have a width L7 of 1.0 mm and a length L8 (length along the track 22) of 1.235 mm.

Now, the grooves 21 and 23 are formed e.g. by an oxygen plasma treatment, etching or the like, using a resist pattern as a mask. More specifically, a magnetic layer in the form of a thin film is formed on the surface of the disk-shaped substrate 2, and a metal layer as a mask layer is formed on the magnetic layer. Further, a resist material is coated on the metal layer to thereby form a resist layer. Then, by an imprinting method in which a stamp (mold) having protrusions corresponding to the shapes of the grooves 21 and 23 is pressed against the resist layer, the convexes and concaves of the stamp are transferred to the resist layer to thereby form a resist pattern on the resist layer. Next, the resist material remaining in the recesses of the resist layer is removed by the oxygen plasma treatment, and thereafter etching is performed on the resist layer using the resist pattern as a mask to form a metal pattern. Subsequently, etching is performed using the metal pattern as a mask. As a result, portions of the magnetic layer, corresponding to the protrusions of the stamp, are removed to thereby form the grooves 21 and 23. It should be noted that the method of forming the grooves 21 and 23 is not limited to the aforementioned method, but it is possible to employ various methods including e.g. a method in which a resist pattern is formed by electron beam lithography, instead of the imprinting method.

Next, operation of the discrete track medium 1 mounted on the HDD during recording or reproducing of record data thereon or therefrom will be described with reference to drawings, mainly concerning a phenomenon occurring with the discrete track medium 1 and the magnetic head 71.

The HDD, not shown, having the discrete track medium 1 mounted thereon is driven for high-speed rotation by the motor, not shown, of the HDD, during recording or reproducing of record data. Further, a servo control mechanism, not shown, moves (performs servo control of) the magnetic head 71 along the radius of the discrete track medium 1, whereby the magnetic head 71 is placed on a track 22 e.g. on a central portion of the data-recording area 3. In this case, the servo control mechanism controls the movement (on-track movement) of the magnetic head 71 such that the center of the magnetic head 71 in the direction of width thereof (along the radius of the discrete track medium 1) and the track 22 are opposed to each other. On the other hand, the high-speed rotation of the discrete track medium 1 generates an air current between the magnetic head 71 and the discrete track medium 1 (data-recording area 3), so that the magnetic head 71 is caused to fly by the lift of the air current. As a result, the magnetic head 71 and the discrete track medium 1 are separated from each other, thereby enabling the magnetic head 71 to move in a state where it is kept from contact with the discrete track medium 1 (enabling the discrete track medium 1 to rotate in a state where it is kept from contact with the magnetic head 71). In this case, since the grooves 21, 21, . . . are formed at the constant pitch in the data-recording area 3, the volume of a space defined between a portion (hereinafter simply referred to as "the outer portion") of the discrete track medium 1 along the radius thereof and outward of the center of the magnetic head 71 in the direction of the width thereof and the data-recording area 3, and the volume of a space defined between a portion (hereinafter simply referred to as "the inner portion") of the discrete track medium 1 along the radius thereof and inward of the center of the magnetic head 71 in the direction of the width thereof and the data-recording area 3 become approximately equal to each other. Therefore, a lift applied to the outer portion of the magnetic head 71, and a lift applied to the inner portion of the same become approximately equal to each other, which makes it possible to raise the magnetic head 71 such that the magnetic head 71 becomes approximately parallel to (approximately horizontal with respect to) the discrete track medium 1.

Further, when data is recorded on a track 22 (track 22A shown in FIG. 2) e.g. at the outermost location of the data-recording area 3, the servo control mechanism moves the magnetic head 71 such that the center of the magnetic head 71 in the direction of width thereof and the track 22A are opposed to each other, to place the magnetic head 71 on the track 22A. When placed on the track 22A, the magnetic head 71 has the outer portion thereof (portion on the left side of the center thereof, as viewed in FIG. 2) protrude into a region above the outer area 4, as indicated by a solid line in FIG. 2. Consequently, as shown in FIG. 2, a lift F1 generated by an air current flowing between the magnetic head 71 and the outer area 4 is applied to the outer portion of the magnetic head 71, and a lift F2 generated by an air current flowing between the magnetic head 71 and the data-recording area 3 is applied to the inner portion of the magnetic head 71 (portion of the magnetic head 71 on the right side of the center thereof, as viewed in FIG. 2), whereby the magnetic head 71 is caused to fly upward. In this case, since the grooves 23, 23, . . . , which have the same shape as that of the grooves 21 and are formed at the same pitch as the pitch of the grooves 21, are formed in the outer area 4, the volume of a space defined between the outer portion of the magnetic head 71 and the outer area 4, and the volume of a space defined between the inner portion of the magnetic head 71 and the data-recording area 3 become approximately equal to each other. Therefore, the lift F1 applied to the outer portion of the magnetic head 71, and the lift F2 applied to the inner portion of the same become approximately equal to each other, and hence as shown in FIG. 2, the magnetic head 71 is caused to fly such that it becomes approximately parallel to the discrete track medium 1, similarly to the case where it is placed on the track 22 at the central portion of the data-recording area 3. As a result, the magnetic head 71 is prevented from being inclined to be brought into contact with the discrete track medium 1 (the data-recording area 3).

Further, when data is recorded on a track 22 (track 22B shown in FIG. 2) e.g. at the innermost location of the data-recording area 3, the servo control mechanism moves the magnetic head 71 such that the center of the magnetic head 71 in the direction of width thereof and the track 22B are opposed to each other, to place the magnetic head 71 on the track 22B. When placed on the track 22B, the magnetic head 71 has an inner portion thereof (portion on the right side of the center thereof, as viewed in FIG. 2) protruded into a region above the inner area 5, as indicated by a broken line in FIG. 2. Consequently, as shown in FIG. 2, the magnetic head 71 is caused to fly by a lift F3 generated by an air current flowing between the magnetic head 71 and the inner area 5, and a lift F4 generated by an air current flowing between the magnetic head 71 and the data-recording area 3. In this case, since the grooves 23, 23, . . . , which have the same shape as that of the grooves 21 and are formed at the same pitch as the pitch of the grooves 21, are formed in the inner area 5, the volume of a space defined between the inner portion of the magnetic head 71 and the inner area 5, and the volume of a space defined between the outer portion of the magnetic head 71 (portion on the left side of the center of the magnetic head 71, as viewed in FIG. 2) and the data-recording area 3 become approximately equal to each other. Therefore, the lift F3 applied to the inner portion of the magnetic head 71 and the lift F4 applied to the outer portion of the same become approximately equal to each other, and hence as shown in FIG. 2, the magnetic head 71 is caused to fly such that it becomes approximately parallel to the discrete track medium 1, similarly to the case where it is placed on the track 22 at the central portion of the data-recording area 3. As a result, the magnetic head 71 is prevented from being inclined to be brought into contact with the discrete track medium 1 (the data-recording area 3).

Figure 7:
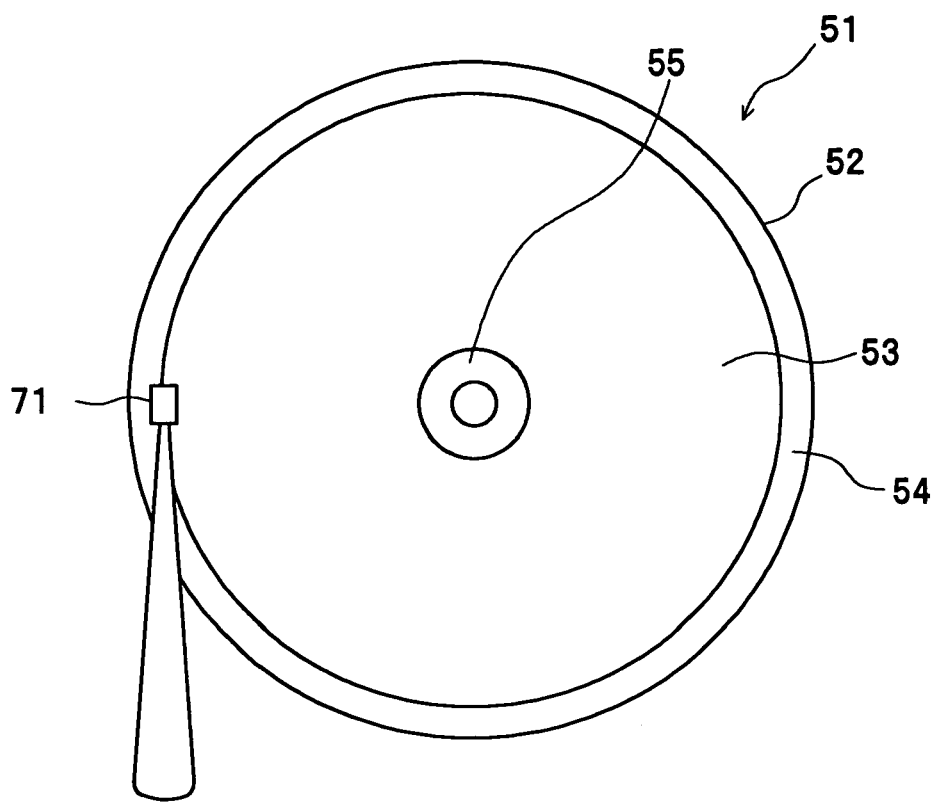
FIG. 7 is a plan view of the conventional discrete track medium in a state in which the recording/reproducing process is being executed thereon.
Figure 8:
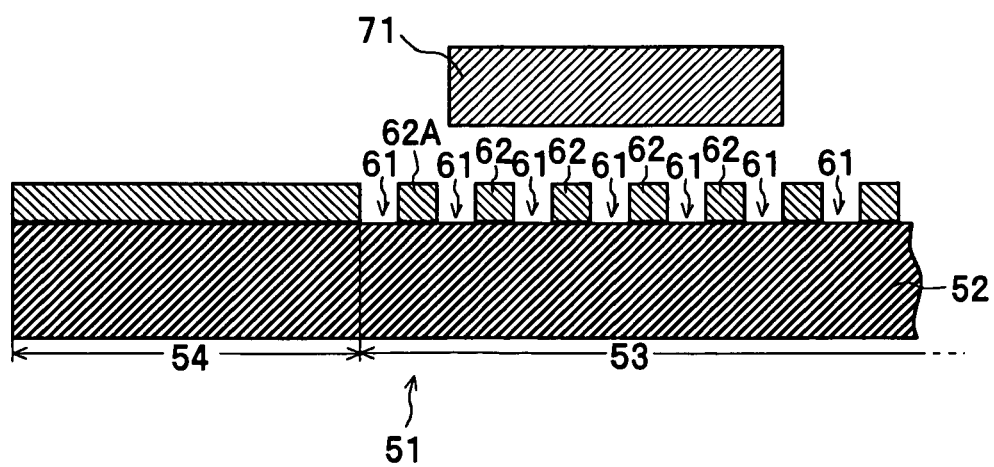
FIG. 8 is a cross-sectional view of the conventional discrete track medium in the state in which the recording/reproducing process is being executed thereon.
Figure 9:
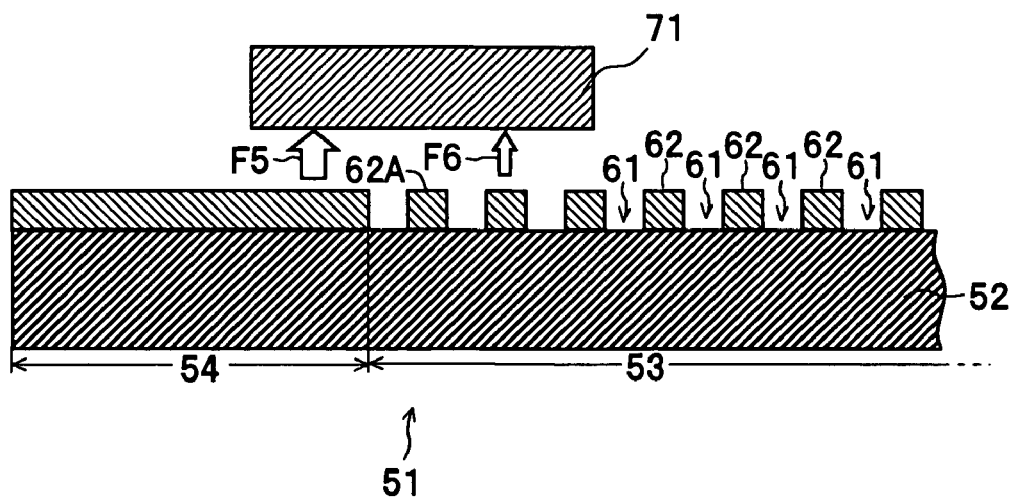
FIG. 9 is a cross-sectional view of the conventional discrete track medium being caused to have a magnetic head placed on a track thereof.
Figure 10:
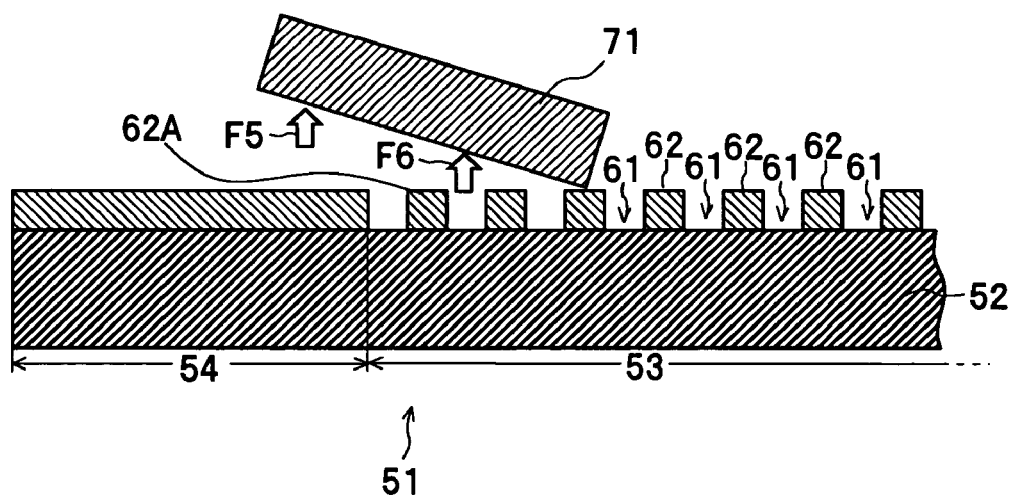
FIG. 10 is a cross-sectional view of the conventional discrete track medium in a state in which the recording/reproducing process is being executed on the track.

It should be noted that a test in which the discrete track medium 1 is rotated at a predetermined rotational speed and a flying height of the magnetic head 71 (distance by which the front surface of the track 22 and the back surface of the magnetic head 71 are spaced from each other) is measured by a laser doppler method was carried out a plurality of times, while changing the distance (measuring position) of the center of the magnetic head 71 in the direction of the width thereof from the center of the discrete track medium 1 (center of the central hole 11). Further, the same test was carried out on a conventional discrete track medium 51 (see FIG. 7) as a comparative example which has an outer area 54 and an inner area 55 not subjected to the lift-adjusting treatment, such as the groove-forming treatment described above.

Figures 3, 4:
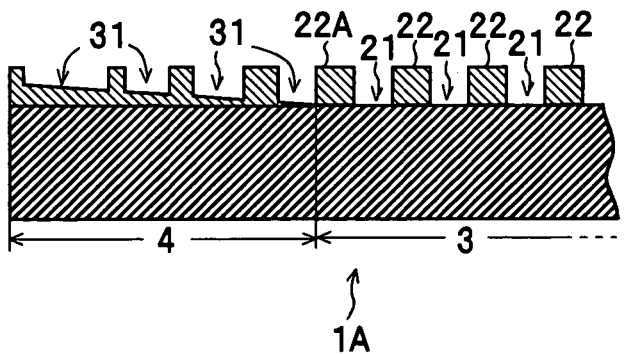
FIG. 3 is a diagram of a table showing results of a test for measuring flying heights of a magnetic head, which is carried out using an HDD having the discrete track medium according to the embodiment mounted thereon, as well as results of the test carried out using an HDD having a conventional discrete track medium as a comparative example mounted thereon.
FIG. 4 is a cross-sectional view of the construction of a discrete track medium according to another embodiment of the present invention.

FIG. 3 shows results of the above tests. It is obvious that in the conventional discrete track medium 51, flying heights at measuring positions (e.g. measuring positions away from the center of the discrete track medium 51 by 4.0 mm to 4.6 mm, as shown in FIG. 3) corresponding to the inner area 55 (or vicinity thereof), and flying heights at measuring positions (e.g. measuring positions away from the center of the discrete track medium 51 by 10.4 mm to 10.8 mm, as shown in FIG. 3) corresponding to the outer area 54 were higher than those at measuring positions (e.g. measuring positions away from the center of the discrete track medium 51 by 4.8 mm to 10.2 mm, as shown in FIG. 3) corresponding to the data-recording area 53. From the above results, it is understood that there is a high probability of the magnetic head 71 being inclined when it is in a state placed on a track 62 at the outermost location, or on a track 62 at the innermost location.

On the other hand, as shown in FIG. 3, in the discrete track medium 1, there were not generated any large differences between flying heights at the measuring positions corresponding to the inner area 5 (or vicinity thereof) and the measuring positions corresponding to the outer area 4, and flying heights at the measuring positions corresponding to the data-recording area 3. From these results, it is clear that the forming of the grooves 23 (subjected to groove-forming treatment) in the outer area 4 and the inner area 5 can prevent the magnetic head 71 from being inclined even when it is placed on the track 22A at the outermost location or on the track 22B at the innermost location.

As described above, according to the discrete track medium 1, the grooves 23 for adjusting lifts generated between the magnetic head 71 and the discrete track medium 1 are formed in the outer area 4 and the inner area 5, respectively, whereby even when the magnetic head 71 is placed on the track 22A at the outermost location (or on the track 22B at the innermost location), for example, causing the outer portion (or inner portion) of the magnetic head 71 to protrude outwardly (inwardly) of the data-recording area 3, the volume of a space defined between the protruding portion and the outer area 4 (or the inner area 5), and the volume of a space defined between the non-protruding portion of the magnetic head 7 (portion located above the data-recording area 3) and the data-recording area 3 can be held equal or approximately equal to each other. Therefore, the lift applied to the protruding portion of the magnetic head 71, and the lift applied to the non-protruding portion thereof can be held equal or approximately equal to each other, so that the magnetic head 71 can be caused to fly such that it becomes parallel or approximately parallel to (horizontal or approximately horizontal with respect to) the discrete track medium 1. As a result, it is possible to effectively prevent the magnetic head 71 from being inclined to be brought into contact with the discrete track medium 1 (the data-recording area 3).

Further, according to the discrete track medium 1, the grooves 23 are formed all over the outer area 4 and the inner area 5, whereby irrespective of the length of a portion of the magnetic head 71 protruding outwardly (or inwardly) of the data-recording area 3 (the protruding length of the magnetic head 71 in the direction of the width thereof), the volume of the space defined between the protruding portion and the outer area 4 (or the inner area 5), and the volume of the space defined between the non-protruding portion of the magnetic head 7 and the data-recording area 3 can be held equal or approximately equal to each other. This makes it possible to mount the discrete track medium 1 capable of effectively preventing contact with the magnetic head 71, on various kinds of HDDs equipped with magnetic heads different in size (width).

Furthermore, according to the discrete track medium 1, the grooves 23 are formed which have the same shape as that of the grooves 21 and are concentrically formed at the same pitch as the pitch of the grooves 21, whereby when a stamp (mold) for a resist pattern used in forming the grooves 21 and 23 is produced, for example, it is possible to form recesses (or protrusions) corresponding to the grooves 21 and recesses (or protrusions) corresponding to the grooves 23 under the same conditions. This makes it possible to form the grooves 23 into accurate shapes, in the same manner as the grooves 21 are formed.

It should be noted that the present invention is by no means limited to the aforementioned embodiment. For example, although in the above-described embodiment, the description has been given of the discrete track medium 1 having the data-recording area 3, the outer area 4, and the inner area 5 formed in one surface (side) of the disk-shaped substrate 2, this is not limitative, but the data-recording area 3, the outer area 4, and the inner area 5 can be formed in both surfaces (sides) of the disk-shaped substrate. Further, although in the above-described embodiment, the description has been given of the discrete track medium 1 having both of the outer area 4 and the inner area 5 thereof formed with the grooves 23 (subjected to the groove-forming treatment), it goes without saying that the grooves 23 may be formed in only one of the areas 4 and 5.

Further, although in the above-described embodiment, the description has been given of the discrete track medium 1 having the grooves 23 formed in the entire outer area 4 and the entire inner area 5, this is not limitative, but, for example, the grooves 23 can be formed in at least one of an annular area defined to have a width equal to the length of the protruding portion of the magnetic head 71 protruding outwardly of the data-recording area 3 in the state where the magnetic head 71 is placed on the track 22A at the outermost location, and an annular area defined to have a width equal to the length of the protruding portion of the magnetic head 71 protruding inwardly of the data-recording area 3 in the state where the magnetic head 71 is placed on the track 22B at the innermost location. Even when the discrete track medium 1 is configured as above, the volume of a space defined between the protruding portion of the magnetic head 71 protruding outwardly (or inwardly) of the data-recording area 3 and the outer area 4 (or the inner area 5) and the volume of the space defined between the non-protruding portion of the magnetic head 71 and the data-recording area 3 can be held equal or approximately equal to each other, so that it is possible to obtain the same advantageous effects as provided by the aforementioned discrete track medium 1 having the grooves 23 formed in the entire outer and inner areas 4 and 5. Further, according to this configuration, the area of portions where the grooves 23 to be formed can be reduced to a minimum required according to the size of the magnetic head 71, which makes it possible to reduce a to-be-machined area of a stamp (mold) for use in forming the tracks 22 and the grooves 23 when it is produced. This makes it possible to reduce the machining costs of stamps, so that it is also possible to reduce the manufacturing costs of the discrete track medium 1.

Figure 5:
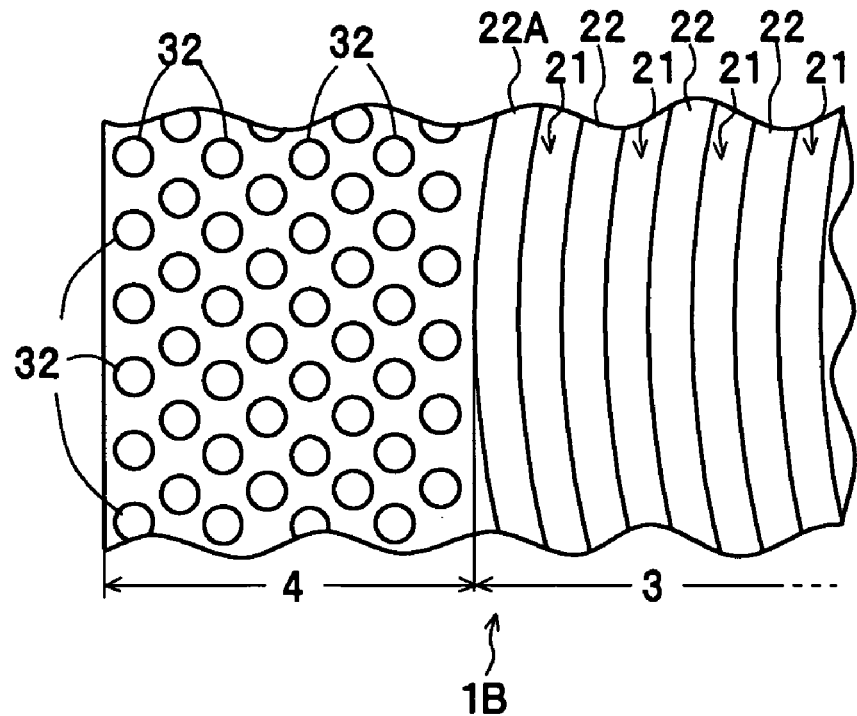
FIG. 5 is a plan view of the construction of a discrete track medium according to still another embodiment of the present invention.
Figure 6:
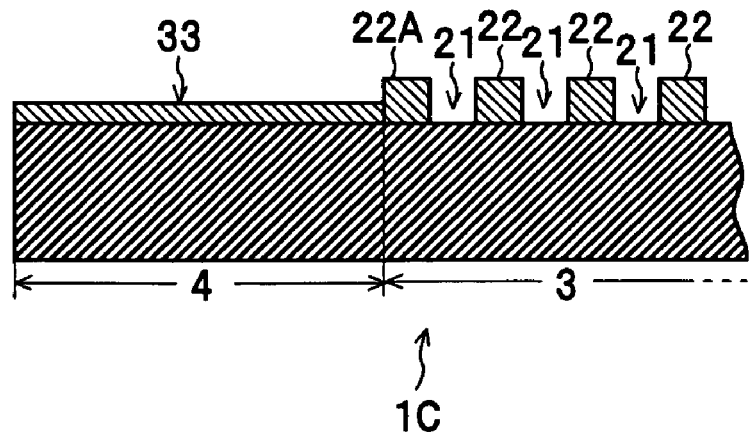
FIG. 6 is a cross-sectional view of the construction of a discrete track medium according to still another embodiment of the present invention.

Further, although in the above-described embodiment, the description has been given of the discrete track medium 1 having the grooves 21, 21, . . . concentrically formed therein, the present invention can be applied to a discrete track medium with a groove spirally formed therein. In this case, it is also possible to form a spiral groove in the outer area 4 and the inner area 5 in place of the concentric grooves 23. Further, although the description has been given of the discrete track medium 1 in which the grooves 23, which have the same shape as that of the grooves 21 and the same pitch as the pitch of the grooves 21, are formed in the outer area 4 and the inner area 5, this is not limitative, but it is possible to form grooves having another shape. Further, it is also possible to form the grooves 23 at a different pitch from the pitch of the grooves 21. In this case, for example, as in a discrete track medium 1A shown in FIG. 4, grooves 31, 31, . . . having different widths and depths from each other (the width is increased and the depth is decreased, toward the outer end of the discrete track medium 1A, in the illustrated example) can be formed in the outer area 4 and the inner area, not shown. Further, the lift-adjusting treatment is not limited to the groove-forming treatment, but it is possible to form lift-adjusting holes (recesses) 32 in the outer area 4 and the inner area 5, not shown, in place of the grooves 23, as in a discrete track medium 1B shown in FIG. 5. Further, as in a discrete track medium 1C shown in FIG. 6, the surface 33 of the outer area 4, and the surface of the inner area, not shown, may be processed such that they become lower than the end faces (top surfaces) of the tracks 22. More specifically, even when the magnetic head 71 is placed on the track 22A (or on the track 22B), causing the outer portion (or inner portion) of the magnetic head 71 to protrude outwardly (inwardly) of the data-recording area 3, the volume of the space defined between the protruding portion and the outer area 4 (or the inner area 5) and the volume of the space defined between the non-protruding portion of the magnetic head 71 (the portion located above the data-recording area 3) and the data-recording area 3 can be held equal or approximately equal to each other. This makes it possible to effectively prevent the magnetic head 71 from being inclined to be brought into contact with the discrete track medium 1.

Further, the present invention can also be applied to a discrete track medium which is manufactured by a process of filling the grooves 21, 21, . . . with a non-magnetic material, and then flattening the surfaces of the grooves 21 (refilling). In this case, in general, even if the flattening is carried out, micro asperities are formed (remain) on the surface of the data-recording area 3, due to the difference between hardness of the non-magnetic material embedded in the grooves 21 and that of a magnetic material forming the tracks 22. As a result, similarly to the operation described in the prior art hereinabove, there is produced a difference between a lift applied to the magnetic head 71 in the data-recording area 3 and a lift applied to the magnetic head 71 in the outer area 4 (or the inner area 5), due to the above micro asperities. This problem is solved by applying the present invention to the refilling process, such that the grooves 23 (or 31) are formed in the outer area 4 and/or the inner area 5, and then the data-recording area 3, and the outer area 4 and/or the inner area 5 are refilled, to thereby form the same micro asperities in these areas. Therefore, also in the refilled discrete track medium, the lifts applied to the magnetic head 71 in the respective areas can be held equal or approximately equal to each other, thereby making it possible to effectively prevent the magnetic head 71 from being inclined to be brought into contact with the discrete track medium 1.

What is claimed is:

1. A discrete track magnetic recording medium comprising:
   a disk-shaped substrate having at least one surface provided with an annular data-recording area, the data-recording area having a plurality of tracks separated from each other by either one of concentric separating grooves or a spiral separating groove;
   an outer area located outward of the data recording-area;
   an inner area located inward of the data-recording area;
   wherein at least one area of either one of the outer area and the inner area provides a lift-adjusting surface; and
   wherein the lift-adjusting surface comprises lift-adjusting grooves which have a same shape or an approximately same shape as that of the separating grooves and are concentrically or spirally formed.

* * * * *